(12) United States Patent
Hofmann et al.

(10) Patent No.: US 12,455,532 B2
(45) Date of Patent: Oct. 28, 2025

(54) DEVICE AND METHOD FOR MANUFACTURING HOLOGRAPHIC OPTICAL ELEMENTS

(71) Applicant: Robert Bosch GmbH, Stuttgart (DE)

(72) Inventors: Johannes Hofmann, Tuebingen (DE); Reinhold Fiess, Durbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 639 days.

(21) Appl. No.: 17/776,049

(22) PCT Filed: Nov. 5, 2020

(86) PCT No.: PCT/EP2020/081089
§ 371 (c)(1),
(2) Date: May 11, 2022

(87) PCT Pub. No.: WO2021/129970
PCT Pub. Date: Jul. 1, 2021

(65) Prior Publication Data
US 2022/0404768 A1 Dec. 22, 2022

(30) Foreign Application Priority Data
Dec. 23, 2019 (DE) ...................... 10 2019 220 511.9

(51) Int. Cl.
*G03H 1/02* (2006.01)
*G02B 26/08* (2006.01)

(52) U.S. Cl.
CPC ....... *G03H 1/0272* (2013.01); *G02B 26/0825* (2013.01); *G03H 2001/0216* (2013.01); *G03H 2001/0232* (2013.01); *G03H 2223/24* (2013.01)

(58) Field of Classification Search
None
See application file for complete search history.

(56) References Cited

U.S. PATENT DOCUMENTS 5,270,842 A * 12/1993 Clay .................. G02B 5/32
430/1
5,327,266 A 7/1994 Mulder et al.
(Continued)

FOREIGN PATENT DOCUMENTS

CN 111247488 A 6/2020
EP 0561302 A1 9/1993
(Continued)

OTHER PUBLICATIONS

International Search Report for PCT/EP2020/081089, Issued Feb. 5, 2021.

*Primary Examiner* — Jyotsna V Dabbi
(74) *Attorney, Agent, or Firm* — NORTON ROSE FULBRIGHT US LLP (57) ABSTRACT

A device and a method for manufacturing holographic optical elements. The device includes at least two partial light beams and one interference light beam, one deformable mirror in each case per partial light beam, a control unit, which is configured to actuate the deformable mirrors to adapt a wavefront of the partial light beam, and a holographic film. The deformable mirrors are situated so as to each reflect precisely one partial light beam and to direct the reflected partial light beam on the holographic film, and the interference light beam being directed on the holographic film to interfere with the reflected partial light beams so as to simultaneously generate at least two holographic optical elements.

15 Claims, 5 Drawing Sheets

(56) References Cited

U.S. PATENT DOCUMENTS

| | | | |
|---|---|---|---|
| 5,877,873 A * | 3/1999 | Bashaw | G11B 7/0065 |
| 2002/0003637 A1 | 1/2002 | Watanabe | |
| 2005/0083532 A1 | 4/2005 | Hansen | |
| 2005/0171008 A1 | 8/2005 | Zhang et al. | |
| 2006/0192866 A1 | 8/2006 | Taguchi | |
| 2008/0042042 A1 * | 2/2008 | King | H01S 3/005 |
| | | | 250/201.9 |
| 2008/0198429 A1 | 8/2008 | Uno et al. | |
| 2011/0236802 A1 | 9/2011 | Li et al. | |

FOREIGN PATENT DOCUMENTS

| | | | | |
|---|---|---|---|---|
| JP | 2013097837 A | 5/2013 | | |
| WO | WO-2017090442 A1 * | 6/2017 | | G02B 27/01 |

* cited by examiner

DEVICE AND METHOD FOR MANUFACTURING HOLOGRAPHIC OPTICAL ELEMENTS

FIELD

The present invention relates to a device and a method for manufacturing holographic optical elements. Furthermore, the present invention relates to a method for handling holographic optical elements.

BACKGROUND INFORMATION

Holographic optical elements are used, for example, in display or sensor systems or in "smart" glasses. For optimum function and accuracy of the holographic optical elements, it is necessary to maintain extremely low tolerances during the manufacture. However, this is often possible not at all or only with high technical expenditure in the case of the large number of optical components necessary for the manufacture.

SUMMARY

A device according to the present invention may have the advantage over the related art that holographic optical elements may be manufactured with particularly high quality, in particular with low tolerances. This may be achieved according to an example embodiment of the present invention by a device, including at least two partial light beams and an interference light beam, and one deformable mirror per partial light beam. An interference light beam is understood here as an interference-capable light beam, in particular including pronounced coherence. In particular, the interference light beam is coherent to the partial light beams. The device preferably includes a light source, which in particular has a high longitudinal coherence, and a beam splitter, light source and beam splitter being configured to generate the partial light beams and the interference light beam. Alternatively, the device may preferably include a separate light source per light beam, the separate light sources preferably being coupled with one another with the aid of a phase coupling. A laser may be provided as the light source, for example.

In accordance with an example embodiment of the present invention, the device includes a control unit to actuate the deformable mirrors. The deformable mirrors may each be actuated by the control unit so as to change a wavefront of the partial light beam. A divergence angle of the corresponding partial light beam may preferably be changed, in particular increased or decreased, by deformation of the deformable mirror. Furthermore, the device includes a holographic film on which the holographic optical elements are generated. The deformable mirrors are situated in such a way that each mirror reflects one partial light beam in each case and directs the reflected partial light beam onto the holographic film. Moreover, the interference light beam is directed, in particular directly, onto the holographic film, so that the holographic optical elements are generated by interference of the interference light beam with the at least two reflected partial light beams simultaneously. In particular, precisely one holographic optical element is generated per partial light beam.

Due to the special arrangement of the components, the device permits the simultaneous exposing of two or more holographic optical elements in the holographic film. The recording method may also be referred to in particular as multiplexing, multiple holographic optical elements being recorded in the same film volume. Holograms having particularly high quality and with or without particularly minor optical errors may thus be manufactured. In particular, the simultaneous exposing has the effect that the holographic optical elements do not mutually influence one another during the manufacturing and thus result in optical errors. The simultaneous manufacturing of the holographic optical elements is promoted in particular by the deformable mirrors, which permit the highest possible quality of the holographic optical elements in a simple and cost-effective manner. The deformability enables a particularly simple and cost-effective structure of the device, a flexible adaptation of the process parameters, for example, the properties of the partial light beams, being possible with the configuration of the device otherwise remaining the same. Holographic optical elements including different properties may thus be generated, for example, easily and cost-effectively, for example, for use in personalized spectacle lenses. Furthermore, the deformable mirrors advantageously enable direct recording of the holographic optical elements, so that preferably copying processes for reproduction may be omitted.

In accordance with an example embodiment of the present invention, the holographic optical elements are preferably suitable for use in augmented reality applications. For example, the holographic optical elements may be used for smart glasses, in particular for retina projection displays. The holographic optical elements are preferably embedded for this purpose in a spectacle lens after their manufacture. The holographic optical elements may also be generated, for example, as lens holograms, in particular to have a predetermined refractive power.

Preferred refinements of the present invention are disclosed herein.

In accordance with an example embodiment of the present invention, the device preferably furthermore includes a dichroic mirror to unite multiple partial light beams. Preferably, at least one partial light beam is directed in each case onto one of the two opposing sides of the dichroic mirror, the incident partial light beams either being reflected or transmitted. In other words, the dichroic mirror is preferably situated in such a way that the optical axes of the united partial light beams match. The dichroic mirror is preferably situated between the deformable mirrors and the holographic film. If more than two partial light beams are provided for generating more than two holographic optical elements, two or more dichroic mirrors may preferably be provided to unite all partial light beams. A particularly flexible structure of the device may thus be achieved, the partial light beams always being able to be aligned optimally.

In accordance with an example embodiment of the present invention, the control unit is particularly preferably configured to actuate the deformable mirrors based on optical properties of the holographic optical elements to be manufactured. In particular, the deformable mirrors may be actuated so as to manufacture holographic optical elements including predefined index of refraction and/or including predefined astigmatic curvature. Alternatively or additionally, the control unit is configured to actuate the deformable mirrors based on manufacturing tolerances. In particular temperature influences, material shrinkages of the holographic film, or a wavelength difference between exposures and later use, that is to say playback, of the holographic optical element are considered to be manufacturing tolerances. Furthermore, the control unit is alternatively or additionally configured to actuate the deformable mirrors based on material properties, in particular an index of refraction, of the holographic film. A particularly flexible adaptation of the partial light beams radiated onto the holographic film may thus be carried out to obtain holographic optical elements having particularly high quality.

The device preferably furthermore includes a focusing element, which is situated between the deformable mirrors and the holographic film. In particular, each reflected partial light beam thus passes the focusing element. The focusing element is situated in such a way that there is an intermediate focus between focusing element and holographic film. For this purpose, a distance between the focusing element and the holographic film is preferably greater than a focal length of the focusing element. The focusing element is preferably a converging lens. Alternatively, the focusing element may also be a more complex optical element which is configured to generate an intermediate focus. A position of the intermediate focus is in particular a function of the divergence angle of the partial light beams incident on the focusing element. That means that the position of the intermediate focus may preferably be changed by deformation of the deformable mirrors. In particular, holographic optical elements may be manufactured by intermediate focusing of the partial light beams which include a lens function, for example, having a predetermined focal length, the focal length being able to be adapted by deformation of the deformable mirrors. Such holographic optical elements including lens function may advantageously be used in smart glasses, for example, to be able to compensate for defective vision of a user in addition to the hologram function.

Furthermore, in accordance with an example embodiment of the present invention, the device preferably includes an aperture which is situated on the mirror side of the holographic film. In particular, the aperture is situated directly adjoining the holographic film. The aperture preferably includes a hologram opening through which partial areas of the partial light beams expose the holographic film to generate the holographic optical elements. The aperture preferably shields, outside the hologram opening, partial areas of the reflected partial light beams not provided for generating the holographic optical elements, in order to obtain particularly sharp and precise holographic optical elements.

The aperture preferably has a marker opening, which is in particular situated adjacent to the hologram opening and at a predefined distance to the hologram opening. The partial light beams incident on the aperture may pass the marker opening to generate a holographic position mark on the holographic film. The holographic position mark is preferably generated simultaneously with the holographic optical elements. Particularly simple and precise handling of the holographic optical elements after their manufacture is possible with the aid of the holographic position mark. For example, exact cutting and/or positioning of the generated holographic elements may be carried out with the aid of the holographic position mark. The holographic position mark may have an arbitrary geometry. A holographic position mark which is cross-shaped or circular is particularly advantageous, the holographic position mark preferably having a small dimension in comparison to the holographic optical elements. Multiple marker openings are particularly preferably provided in the aperture to generate multiple holographic position marks.

In accordance with an example embodiment of the present invention, a side of the aperture facing toward the holographic film is particularly preferably made reflective. A holographic position mark is thus generated on the holographic film by reflection of the interference light beam on the aperture. Preferably, only a partial area of the aperture is made reflective. In this case, the holographic position mark is generated in particular in the form of a Denisyuk hologram. A particularly simple and cost-effective structure of the device thus results, in order to generate additional position marks in the holographic film in addition to the holographic optical elements.

Furthermore, the present invention relates to a method for manufacturing holographic optical elements. In accordance with an example embodiment of the present invention, in the method, at least two partial light beams and one interference light beam are generated. Each partial light beam is reflected on a deformable mirror in each case. The reflected partial light beams interfere in the holographic film with the interference light beam, so that at least two holographic optical elements are generated in the holographic film simultaneously. The deformable mirrors are deformed to adapt a wavefront of the particular object light beam. For the deformation of the deformable mirrors, they are preferably actuated with the aid of a control unit. Due to the simultaneous exposure of the at least two holographic optical elements, the method permits manufacturing of these holographic optical elements with particularly high quality and minor tolerances.

In accordance with an example embodiment of the present invention, in the method, multiple partial light beams are particularly preferably united with the aid of a dichroic mirror to obtain a particularly flexible method which is easy to carry out. The partial light beams reflected from the deformable mirrors are preferably united with the aid of the dichroic mirror and the united partial light beams are radiated on the holographic film.

The deformable mirrors are preferably deformed based on optical properties of the holographic optical element to be manufactured and/or based on manufacturing tolerances and/or based on material properties of the holographic film to be able to manufacture holographic optical elements of particularly high quality adapted optimally for greatly varying intended uses. The actuation of the deformable mirrors may preferably be iteratively adapted by multiple repetitions of the method, to optimize the holographic optical elements to be manufactured in a particularly simple manner. Alternatively or additionally, it may be ascertained beforehand by simulation how the deformable mirrors are to be actuated to achieve the desired properties of the holographic optical elements.

An intermediate focus is particularly preferably generated between the deformable mirrors and the holographic film with the aid of a focusing element, which is preferably designed as a converging lens, in particular to generate holographic optical elements including a lens function.

In accordance with an example embodiment of the present invention, a holographic position mark is preferably generated on the holographic film with the aid of an aperture, situated on the mirror side of the holographic film, which includes a marker opening. The holographic position mark may be used after the manufacture of the holographic optical elements, for example, to enable precise cutting and/or positioning of the manufactured holographic elements. The holographic position mark is particularly preferably generated simultaneously with the holographic optical elements in the holographic film with the aid of the reflected partial light beams. Alternatively, the holographic position mark may preferably be generated in a separate manufacturing step, for example, before or after the exposure of the holographic optical elements. The holographic position mark is preferably generated adjacent, in particular at a predefined distance, to the holographic optical elements on the holographic film. Alternatively, the holographic position mark may also be generated inside, in particular as a part of, the holographic optical elements.

Furthermore, a holographic position mark is preferably generated on the holographic film by reflection of the interference light beam on an aperture situated on the mirror side of the holographic film. In this case, the interference light beam is preferably radiated through the holographic film in such a way that at least one partial area of the interference light beam is reflected on the aperture to generate the holographic position mark. The holographic position mark is generated here in the form of a Denisyuk hologram.

Furthermore, the present invention relates to a method for handling holographic optical elements which are manufactured with the aid of the above-described device or by the described method. In accordance with an example embodiment of the present invention, in the method for handling, the holographic optical elements are cut and/or positioned based on an optical recognition of the holographic position mark which was exposed on the holographic film with the aid of the aperture. The optical recognition may preferably be carried out with the aid of a camera or another optical sensor. A particularly precise arrangement of the manufactured holographic elements on a product, for example a spectacle lens of smart glasses, may thus be enabled.

BRIEF DESCRIPTION OF THE DRAWINGS

The present invention is described hereinafter on the basis of exemplary embodiments in conjunction with the figures. In the figures, functionally identical components are each provided with identical reference numerals.

DETAILED DESCRIPTION OF EXAMPLE EMBODIMENTS

Figure 1:
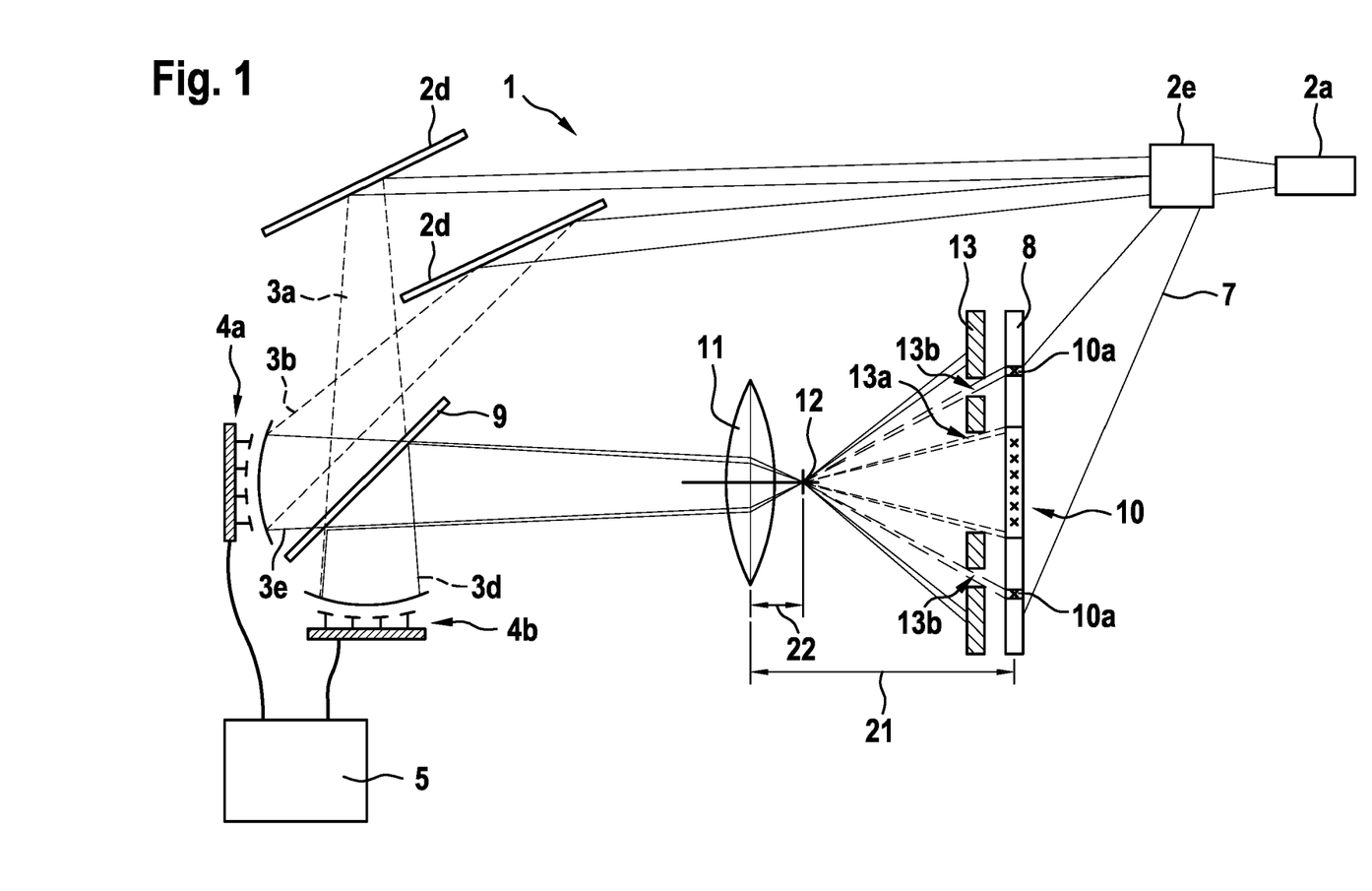
FIG. 1 shows a schematic view of a device for manufacturing holographic optical elements according to a first exemplary embodiment of the present invention.

FIG. 1 shows a simplified schematic view of a device 1 for manufacturing holographic optical elements 10 according to a first exemplary embodiment of the present invention. Holographic optical elements 10 manufactured with the aid of device 1 are shown in a top view in FIG. 2.

Device 1 includes a laser as light source 2a. The light beam generated by light source 2a is divided in a beam splitter 2e into two partial light beams 3a, 3b and an interference light beam 7.

The two partial light beams 3a, 3b are each deflected with the aid of a mirror 2d and directed onto one deformable mirror 4a, 4b in each case. Partial light beams 3a, 3b are reflected in a controllable manner on deformable mirrors 4a, 4b.

Device 1 furthermore includes a control unit 5, which is configured to actuate the two deformable mirrors 4a, 4b. Deformable mirrors 4a, 4b may be deformed by the actuation in such a way that a wavefront of partial light beams 3a, 3b is changed. For example, a divergence angle of partial light beams 3a, 3b may be increased or decreased by the deformation of deformable mirrors 4a, 4b.

Partial light beams 3d, 3e reflected at deformable mirrors 4a, 4b are subsequently united with the aid of a dichroic mirror 9. That means, a first reflected partial light beam 3d is reflected at dichroic mirror 9 and a second reflected partial light beam 3e is radiated through dichroic mirror 9, so that both reflected partial light beams 3d, 3e are subsequently provided coaxially.

United reflected partial light beams 3d, 3e are bundled with the aid of a focusing element 11, which is designed as a converging lens, in an intermediate focus 12. After intermediate focus 12, reflected object light beams 3d, 3e are incident on a holographic film 8. Holographic film 8 is situated at a distance 21 to focusing element 11 which corresponds to four times focus distance 22 of intermediate focus 12 from focusing element 11.

Holographic film 8 is moreover irradiated from an opposite side using interference light beam 7. Reflected partial light beams 3d, 3e and interference light beam 7 interfere in holographic film 8 in such a way that two holographic optical elements 10 are generated in holographic film 8.

The two reflected partial light beams 3d, 3e thus simultaneously expose holographic film 8, so that the two holographic optical elements 10 are generated simultaneously. Due to the simultaneous generation of holographic optical elements 10 with the aid of reflected partial light beams 3d, 3e, which include wavefronts adapted by deformable mirrors 4a, 4b optimally to the desired intended use or to the desired optical properties, holographic optical elements 10 of particularly high quality and of particularly reproducible properties may be manufactured.

To obtain a defined image on holographic film 8, furthermore an aperture 13 is provided which is situated on the mirror side directly adjoining holographic film 8. Aperture 13 includes a hologram opening 13a, through which holographic optical elements 10 to be generated are exposed on holographic film 8.

Figure 2:
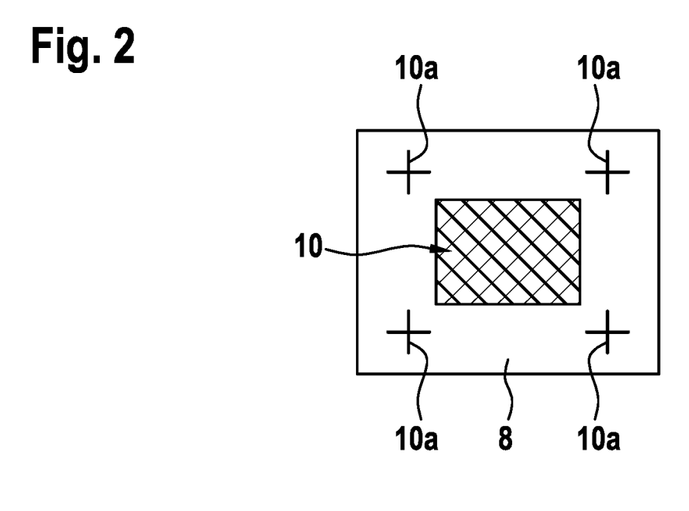
FIG. 2 shows a schematic view of the holographic optical elements manufactured with the aid of the device of FIG. 1.

In addition, aperture 13 includes multiple marker openings 13b, which are provided adjacent to hologram opening 13a in aperture 13. Marker openings 13b also permit a passage of reflected partial light beams 3d, 3e through the aperture to generate holographic position marks 10a (cf. FIG. 2) on holographic film 8 adjacent to holographic optical elements 10. For reasons of illustration, only two marker openings are indicated in FIG. 1, actually four marker openings 13a being provided in aperture 13 to generate four holographic position marks 10a, as shown in FIG. 2. Holographic position marks 10a have a cross shape and are provided to be able to exactly determine a position and an alignment, in particular optical axes, of holographic optical elements 10, for precise handling of holographic optical elements 10.

Figure 3:
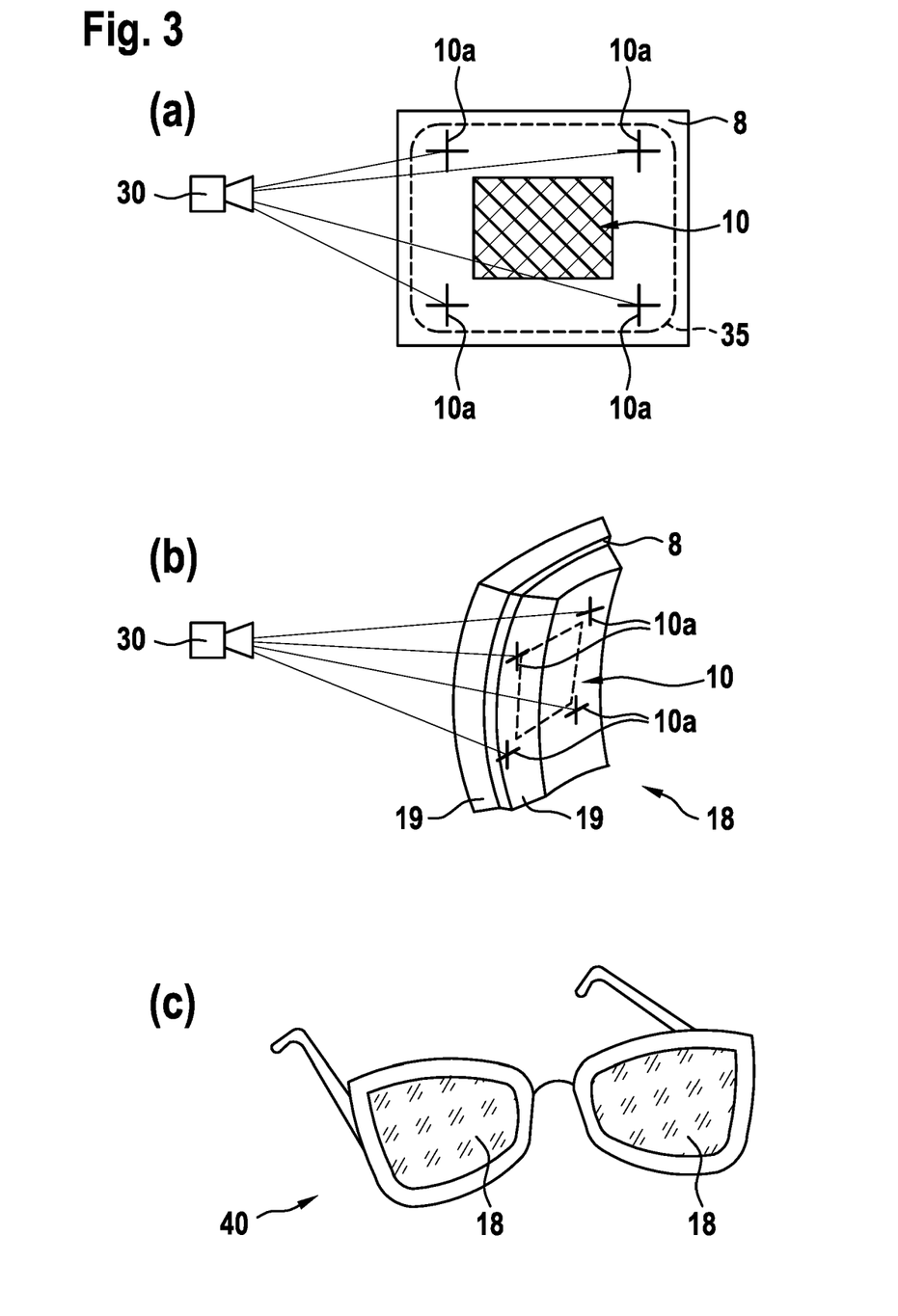
FIG. 3 shows a schematic representation of handling of the holographic optical elements of FIG. 2.

The handling of holographic optical elements 10 after their manufacture is described hereinafter on the basis of FIG. 3. In a first step (image (a) of FIG. 3), the exact instantaneous position and alignment of holographic optical elements 10 is detected on the basis of holographic position marks 10a with the aid of a camera 30. Cutting of holographic film 8 on a cutting line 35 indicated by a dashed line may be carried out, for example, with the aid of a cutting device (not shown).

Subsequently, in a second step (cf. image (b) of FIG. 3), holographic film 8 including holographic optical elements 10 is embedded between two curved cover layers 19 and aligned precisely with the aid of holographic position marks 10*a* to obtain a spectacle lens 18. Spectacle lens 18 may subsequently be used in smart glasses 40, as shown in image (c) of FIG. 3.

Figure 4:
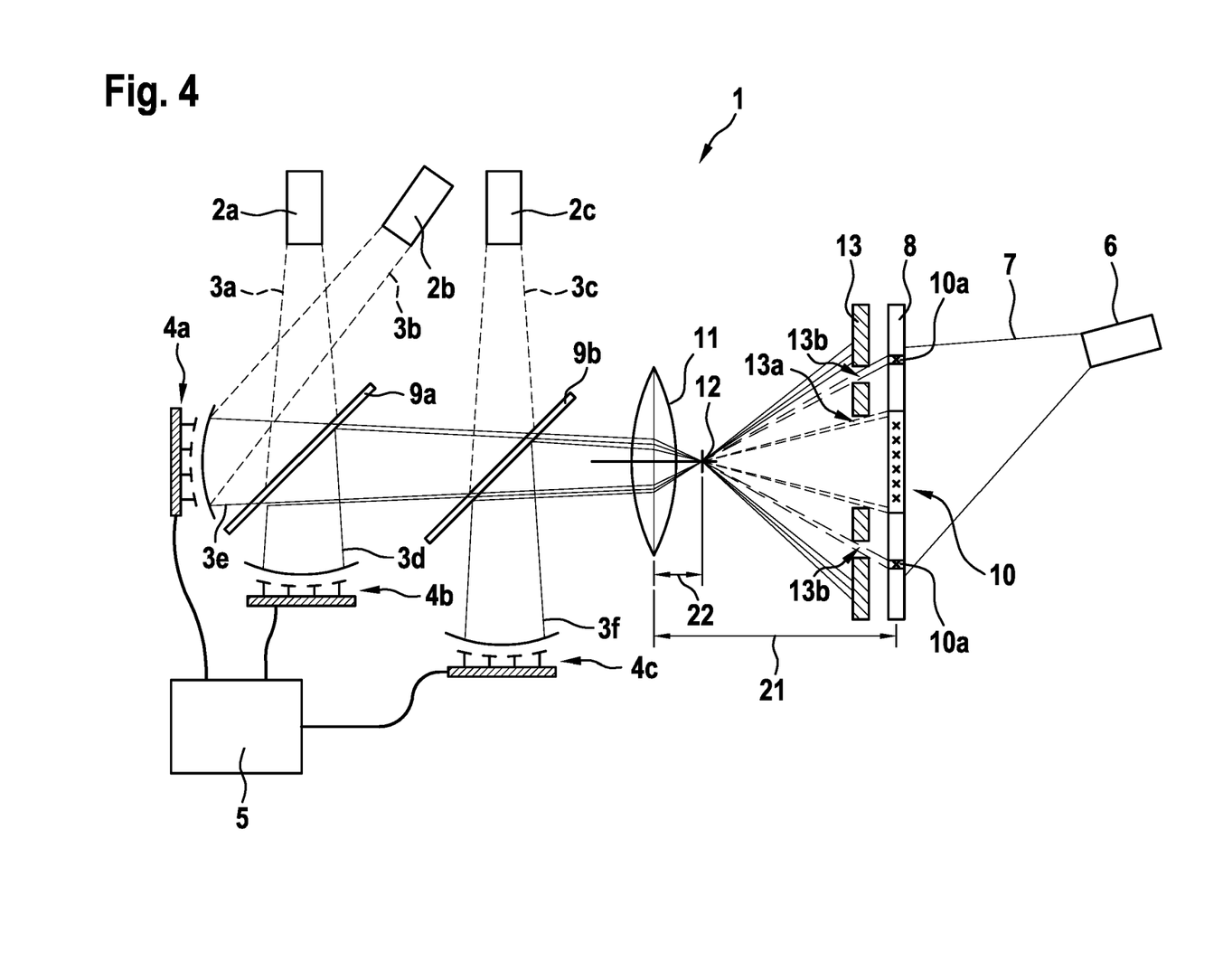
FIG. 4 shows a schematic view of a device for manufacturing holographic optical elements according to a second exemplary embodiment of the present invention.

FIG. 4 shows a schematic view of a device 1 for manufacturing holographic optical elements 10 according to a second exemplary embodiment of the present invention. The second exemplary embodiment essentially corresponds to the first exemplary embodiment of FIG. 1 with the difference that three instead of two partial light beams 3*a*, 3*b*, 3*c* are provided, which are each emitted from a separate light source 2*a*, 2*b*, 2*c*. Correspondingly, three holographic optical elements 10 are exposed simultaneously in holographic film 8. Furthermore, a further separate light source 6 is additionally provided to emit the interference light beam. To unite partial light beams 3*d*, 3*e*, 3*f*, each reflected from deformable mirrors 4*a*, 4*b*, 4*c* in the second exemplary embodiment, two dichroic mirrors 9*a*, 9*b* are arranged in succession.

Figure 5:
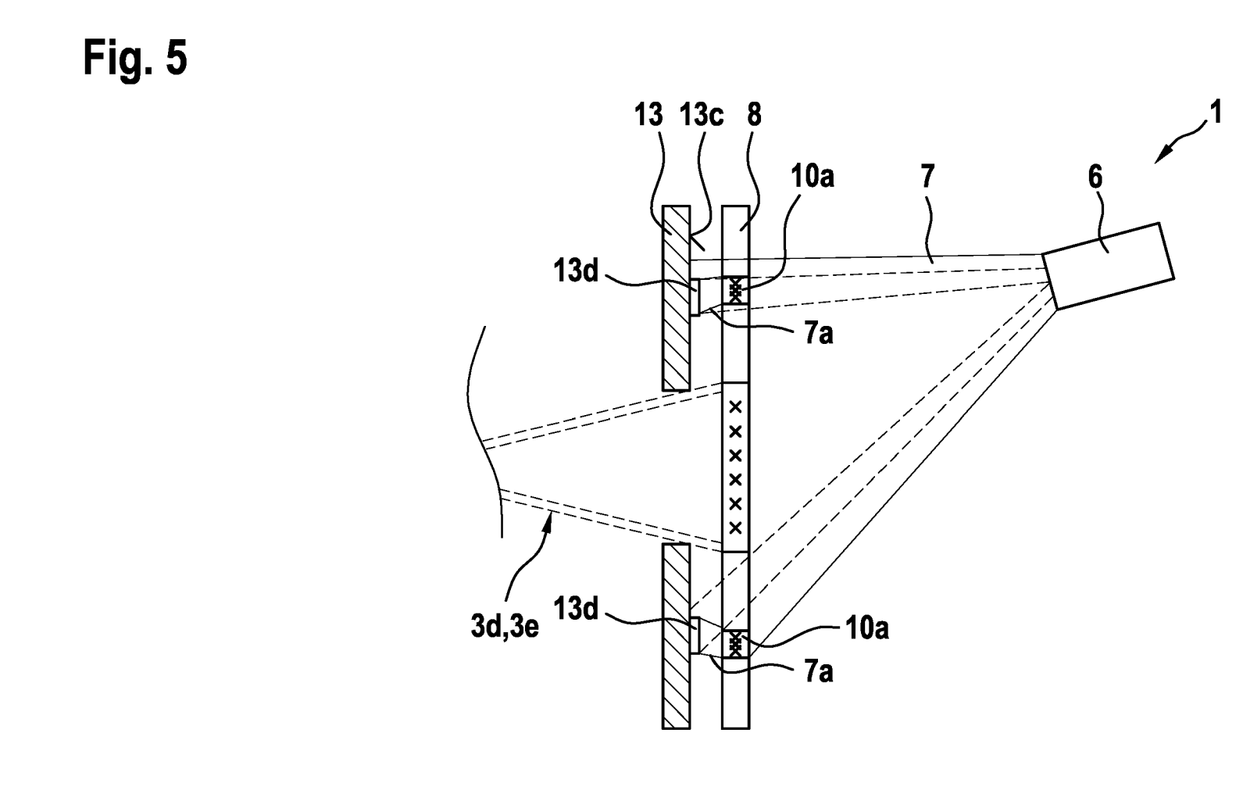
FIG. 5 shows a schematic detail view of a device for manufacturing holographic optical elements according to a third exemplary embodiment of the present invention.

FIG. 5 shows a schematic detail view of a device 1 for manufacturing holographic optical elements 10 according to a third exemplary embodiment of the present invention. Only a detail of device 1 is shown in FIG. 5, the parts not shown being identical to device 1 of the first exemplary embodiment in FIG. 1. The third exemplary embodiment essentially corresponds to the first exemplary embodiment of FIG. 1 with the difference that holographic position marks 10*a* are exposed in an alternative manner in holographic film 8. In the third exemplary embodiment, holographic position marks 10*a* are generated by reflection of interference light beam 7 on a side 13*c* of aperture 13 facing toward holographic film 8. For this purpose, aperture 13 includes reflection elements 13*d* on side 13*c*, with the aid of which interference light beam 7, which is in particular radiated through holographic film 8, is reflected. Reflected interference light beam 7*a* accordingly interferes in holographic film 8 with incident interference light beam 7 in such a way that holographic position marks 10*a* are generated. In the third exemplary embodiment, holographic position marks 10*a* are thus generated in the form of so-called Denisyuk holograms.

What is claimed is:

1. A device for manufacturing holographic optical elements, comprising:
   at least two partial light beams and one interference light beam;
   one deformable mirror per partial light beam of the at least two partial light beams;
   a control unit configured to actuate each of the deformable mirrors independently to adapt a wavefront of the partial light beams; and
   holographic film;
   wherein:
      the deformable mirrors are situated so as to each reflect precisely one partial light beam of the least two partial light beams and to direct the reflected partial light beam on the holographic film; and
      the interference light beam is directed on the holographic film to interfere with the reflected partial light beams to simultaneously generate at least two holographic optical elements.

2. The device as recited in claim 1, further comprising a dichroic mirror configured to unite multiple of the partial light beams.

3. The device as recited in claim 1, wherein the control unit is configured to actuate the deformable mirrors based on optical properties of the holographic optical elements to be manufactured and/or based on manufacturing tolerances and/or based on material properties of the holographic film.

4. The device as recited in claim 1, further comprising:
   a focusing element, which is situated between the deformable mirrors and the holographic film, the focusing element being situated and configured so as to generate an intermediate focus between the focusing element and the holographic film.

5. The device as recited in claim 1, further including an aperture, which is situated on a mirror side of the holographic film.

6. The device as recited in claim 5, wherein the aperture includes a marker opening configured to generate a holographic position mark on the holographic film.

7. The device as recited in claim 5, wherein a side of the aperture facing toward the holographic film is reflective to generate a holographic position mark on the holographic film by reflection of the interference light beam on the aperture.

8. A method for manufacturing holographic optical elements, comprising the following steps:
   generating at least two partial light beams and one light beam;
   reflecting each of the partial light beams on a respective deformable mirror, the reflected partial light beams being radiated simultaneously on a holographic film, the reflected partial light beams interfering in the holographic film with the one light beam to generate at least two holographic optical elements simultaneously; and
   deforming each of the deformable mirrors independently to adapt a wavefront of the respective partial light beam.

9. The method as recited in claim 8, wherein multiple ones of the partial light beams are united using a dichroic mirror.

10. The method as recited in claim 8, wherein the deformable mirrors are deformed based on optical properties of the holographic optical elements to be manufactured and/or based on manufacturing tolerances and/or based on material properties of the holographic film.

11. The method as recited in claim 8, wherein an intermediate focus is generated between the deformable mirrors and the holographic film using a focusing element.

12. The method as recited in claim 8, wherein a holographic position mark is generated on the holographic film using an aperture, which is situated on a mirror side of the holographic film, including a marker opening.

13. The method as recited in claim 8, wherein a holographic position mark is generated on the holographic film by reflection of the interference light beam on an aperture situated on a mirror side of the holographic film.

14. The method as recited in claim 13, further comprising:
   cutting and/or positioning the holographic optical elements based on an optical recognition of the holographic position mark.

15. A method for handling holographic optical elements, which are manufactured by:
   generating at least two partial light beams and one light beam,
   reflecting each of the partial light beams on a respective deformable mirror, the reflected partial light beams being radiated simultaneously on a holographic film, the reflected partial light beams interfering in the holographic film with the one light beam to generate at least two holographic optical elements simultaneously, and deforming each of the deformable mirrors independently to adapt a wavefront of the respective partial light beam;

generating a holographic position mark on the holographic film using an aperture, which is situated on a mirror side of the holographic film, including a marker opening; and cutting and/or positioning the holographic optical elements based on an optical recognition of the holographic position mark.

\* \* \* \* \*